US012747522B2

(12) United States Patent
Song

(10) Patent No.: US 12,747,522 B2
(45) Date of Patent: *Sep. 29, 2026

(54) SELF-ADAPTIVE FABRIC FOR SPACE APPLICATIONS

(71) Applicant: Blue Origin Manufacturing, LLC, Huntsville, AL (US)

(72) Inventor: Weidong Song, Woodinville, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/276,546

(22) Filed: Jul. 22, 2025

(65) Prior Publication Data

US 2025/0347036 A1 Nov. 13, 2025

Related U.S. Application Data

(63) Continuation of application No. 18/625,653, filed on Apr. 3, 2024, now Pat. No. 12,392,059.

(51) Int. Cl.

*D03D 15/30* (2021.01)
*B64G 6/00* (2006.01)

(Continued)

(52) U.S. Cl.

CPC ............... *D03D 15/30* (2021.01); *B64G 6/00* (2013.01); *D01D 5/247* (2013.01); *D03D 1/02* (2013.01);

(Continued)

(58) Field of Classification Search

CPC .......... D03D 15/30; D03D 1/02; D03D 11/00; D03D 15/275; D03D 15/283; D03D 15/56;

(Continued)

(56) References Cited

U.S. PATENT DOCUMENTS

| | | | | |
|---|---|---|---|---|
| 2,815,559 A * | 12/1957 | Robinson | ............. | D02G 1/0253 57/286 |
| 3,428,960 A | 2/1969 | Schueller | | |

(Continued)

FOREIGN PATENT DOCUMENTS

| | | |
|---|---|---|
| DE | 1669365 A1 | 7/1970 |
| DE | 10219461 A1 | 11/2003 |

(Continued)

OTHER PUBLICATIONS

Paul, Heather L., and Kenneth R. Diller. "Comparison of Thermal Insulation Performance of Fibrous Materials for the Advanced Space Suit." *Journal of Biomechanical Engineering* 125(5): 639-647, Oct. 9, 2003, DOI: https://doi.org/10.1115/1.1611885.

*Primary Examiner* — Robert H Muromoto, Jr.

(74) *Attorney, Agent, or Firm* — Knobbe, Martens, Olson & Bear, LLP

(57) ABSTRACT

Self-adaptive fabrics for space applications are provided. In one aspect, a fabric for use in space includes a structural fabric and a plurality of synthetic fibers woven into a self-adaptive fabric. The self-adaptive fabric is attached to the structural fabric. Each of the synthetic fibers includes a plurality of hollow cells containing a trapped gas. The synthetic fibers are formed of a material having a sufficient (Continued)

elasticity such that the diameter of each of the synthetic fibers is configured to increase when the environmental pressure decreases.

22 Claims, 4 Drawing Sheets

(51) Int. Cl.

| | |
|---|---|
| ***D01D 5/247*** | (2006.01) |
| ***D03D 1/02*** | (2006.01) |
| ***D03D 11/00*** | (2006.01) |
| ***D03D 15/275*** | (2021.01) |
| ***D03D 15/283*** | (2021.01) |
| ***D03D 15/56*** | (2021.01) |

(52) U.S. Cl.
CPC ........... *D03D 11/00* (2013.01); *D03D 15/275* (2021.01); *D03D 15/283* (2021.01); *D03D 15/56* (2021.01); *D10B 2331/021* (2013.01); *D10B 2331/06* (2013.01); *D10B 2331/10* (2013.01); *D10B 2331/12* (2013.01); *D10B 2501/04* (2013.01)

(58) Field of Classification Search
CPC .... B64G 6/00; D01D 5/247; D10B 2331/021; D10B 2331/06; D10B 2331/10; D10B 2331/12; D10B 2501/04
See application file for complete search history.

(56) References Cited

U.S. PATENT DOCUMENTS

| | | | | |
|---|---|---|---|---|
| 5,579,609 | A | 12/1996 | Sallee | |
| 5,939,198 | A * | 8/1999 | Howard, Jr. | B01D 67/0027 521/64 |
| 6,153,135 | A * | 11/2000 | Novitsky | C03B 19/08 264/102 |
| 8,857,203 | B2 * | 10/2014 | Hodgson | B64G 6/00 62/283 |
| 9,079,674 | B1 * | 7/2015 | Grillos | B64G 1/22 |
| 10,279,549 | B2 * | 5/2019 | Grove-Nielsen | B29C 70/48 |
| 11,192,667 | B2 * | 12/2021 | Gordon | B32B 27/308 |
| 11,752,680 | B2 * | 9/2023 | Song | B29C 48/92 264/171.26 |
| 11,773,516 | B2 * | 10/2023 | Göktepe | F03G 7/0612 442/303 |
| 11,975,516 | B2 * | 5/2024 | King | B32B 3/266 |
| 12,392,059 | B1 * | 8/2025 | Song | D03D 15/56 |
| 2021/0156056 | A1 | 5/2021 | Alexander et al. | |
| 2021/0355306 | A1 | 11/2021 | Green et al. | |

FOREIGN PATENT DOCUMENTS

| | | | |
|---|---|---|---|
| EP | 0 689 991 | A1 | 1/1996 |
| JP | H 07-252723 | A | 10/1995 |

* cited by examiner

SELF-ADAPTIVE FABRIC FOR SPACE APPLICATIONS

CROSS-REFERENCE TO RELATED APPLICATIONS

The present application is a continuation of U.S. patent application Ser. No. 18/625,653, filed on Apr. 3, 2024, the entire content of which is incorporated by reference herein.

BACKGROUND

Technical Field

The described technology relates generally to fabrics for space applications, and in particular, fabrics which are self-adaptive.

Description of the Related Technology

The environmental conditions in space can be significantly different from typical environmental conditions on the Earth. Thus, fabrics used in space application may be designed specifically for the environmental conditions that can be encountered in space.

SUMMARY OF CERTAIN INVENTIVE ASPECTS

The embodiments disclosed herein each have several aspects no single one of which is solely responsible for the present disclosure's desirable attributes. Without limiting the scope of the present disclosure, its more prominent features will now be briefly discussed. After considering this discussion, and particularly after reading the section entitled "Detailed Description" one will understand how the features of the embodiments described herein provide advantages over existing methods of manufacturing large space habitats.

In one aspect, a fabric for use in space is provided. The fabric includes a structural fabric; and a plurality of synthetic fibers woven into a self-adaptive fabric, the self-adaptive fabric being attached to the structural fabric. Each of the plurality of synthetic fibers includes a plurality of hollow cells containing a trapped gas. The plurality of synthetic fibers are formed of a material having a sufficient elasticity such that the diameter of each of the plurality of synthetic fibers is configured to increase when the environmental pressure decreases.

In some embodiments, the structural fabric is configured to restrict a direction in which the self-adaptive fabric expands when exposed to the decreasing environmental pressure.

In some embodiments, the structural fabric and the self-adaptive fabric are woven together.

In some embodiments, an interface between the structural fabric and the self-adaptive fabric includes a gradual transition from the structural fabric into the self-adaptive fabric.

In some embodiments, the hollow cells are isolated from each other such that gas and liquid does not pass between adjacent hollow cells.

In some embodiments, the gas includes carbon dioxide, argon, nitrogen, and/or air.

In some embodiments, the structural fabric includes Kevlar and/or carbon fiber.

In some embodiments, the material of the synthetic fibers includes a polyether-polyurea copolymer, Spandex, and/or Lycra.

In some embodiments, the structural fabric and the self-adaptive fabric are moisture permeable to allow moisture to escape.

In another aspect, a space suit includes the fabric for use in space, where the fabric is orientated such that the self-adaptive fabric is closer to the interior of the space suit than the structural fabric.

In some embodiments, the self-adaptive fabric is constrained by the structural fabric such that the self-adaptive fabric expands into the interior of the space suit when exposed to the decreasing environmental pressure.

In some embodiments, the self-adaptive fabric is configured to apply a pressure of 10-12 psi to a user of the space suit.

In yet another aspect, an inflatable habitat includes the fabric for use in space, where the fabric is orientated such that the self-adaptive fabric is closer to the exterior of the inflatable habitat than the structural fabric.

In some embodiments, the inflatable habitat further includes layers of metal applied to the interior of the structural fabric to form a structural metal shell.

In still yet another aspect, a method of manufacturing a fabric for use in space is provided. The method includes providing a stream of self-adaptive fabric material; periodically injecting a gas into a center of the stream of self-adaptive fabric material to create a plurality of gas-filled hollow cells; allowing the stream of self-adaptive fabric material to cool into a synthetic fiber; and weaving the synthetic fiber into a self-adaptive fabric.

In some embodiments, the method further includes weaving the self-adaptive fabric into a structural fabric.

In some embodiments, weaving the self-adaptive fabric into the structural fabric includes weaving an interface between the structural fabric and the self-adaptive fabric that includes a gradual transition from the structural fabric into the self-adaptive fabric.

In some embodiments, injecting the gas into the center of the stream of self-adaptive fabric material is performed using a needle.

In some embodiments, the hollow cells are isolated from each other such that gas and liquid does not pass between adjacent hollow cells.

In some embodiments, the gas includes carbon dioxide, argon, nitrogen, and/or air.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. The relative dimensions and proportions as shown are not intended to limit the present disclosure. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Aspects of this disclosure relate to self-adaptive (or "smart") fabric materials which can be employed in a variety of different space applications. In various implementations, a self-adaptive fabric material can include a structural fabric and a plurality of synthetic fibers woven into a self-adaptive fabric attached to the structural fabric. Each of the synthetic fibers can include a plurality of hollow cells containing a trapped gas and be formed of a material having a sufficient elasticity such that the diameter of each of the synthetic fibers increases when the environmental pressure decreases.

The self-adaptive fabric can expand when exposed to decreasing environmental pressure and contract when exposed to increasing environmental pressure, thereby adapting to the environmental pressure. The structural fabric can be configured to restrict the direction(s) in which the self-adaptive fabric can expand or contract, providing structure and shape to the self-adaptive fabric material. Thus, smart fabric material can adapt its geometry and stiffness when exposed to a vacuum environment, making the smart fabric material an attractive solution for deployable structures in space. Embodiments of the smart fabric material can eliminate or reduce the need for any form of bladder and associated deployment mechanism, which can be heavy, inefficient, and introduce a single point of failure when used in relatively large systems. Advantageously, the self-adaptive fabric can be used to build large space habitats and mechanical counterpressure (MCP) pressure space suits, among many other applications.

Figure 1:
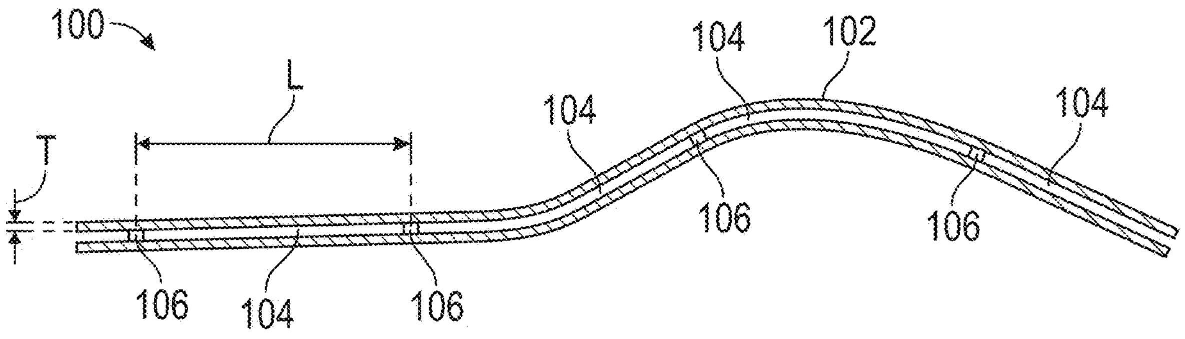
FIG. 1 is a cross-sectional view of a synthetic fiber which can be woven into a self-adaptive fabric according to aspects of this disclosure.

FIG. 1 is a cross-sectional view of a synthetic fiber 100 which can be woven into a self-adaptive fabric according to aspects of this disclosure. With reference to FIG. 1, the synthetic fiber 100 is formed of a body 102 having a plurality of hollow cells 104 separated by a plurality of barriers 106. The barriers 106 can isolate the hollow cells 104 from each other, such that matter, for example gas or liquid, does not pass from one hollow cell 104 to an adjacent hollow cell 104. Each of the plurality of hollow cells 104 can contain a trapped gas. As described herein, the gas enclosed in each of the plurality of hollow cells 104 applies pressure that is equalized with the environmental pressure applied to the synthetic fiber 100 along with any compressive force introduced by the body 102.

The body 102 and the plurality of barriers 106 can be formed of a material having a sufficient elasticity such that the diameter of each of the synthetic fibers is configured to increase when the environmental pressure decreases. For example, the material can be an elastic or elastomeric material that enables the synthetic fiber 100 to expand and contract in response to changes in the environmental pressure applied to the synthetic fiber 100. Example, non-limiting materials which can be used to construct the synthetic fiber 100 include a polyether-polyurea copolymer, Spandex, Lycra, natural rubber, synthetic rubber, or other polymers. Other materials can be suitably implemented in embodiments of this disclosure.

Depending on the embodiment, the gas enclosed in the plurality of hollow cells 104 can be a relatively large molecule gas to reduce leakage of the gas from the synthetic fiber 100. In contrast, when a relatively small molecule gas, such as helium or nitrogen is used, leakage of the gas from the synthetic fiber may be more likely. Example, non-limiting gases which can be enclosed in the plurality of hollow cells 104 include air, carbon dioxide, argon, nitrogen, etc. In some implementations, oxygen can be removed from air before being entrapped in the plurality of hollow cells 104 to reduce oxidization. Depending on the application of the synthetic fiber 100 (such as when incorporated into a space suit), a certain level of leakage within an acceptable range may be tolerable, which can thereby increase the options for gasses which can be suitably used for the synthetic fiber 100.

As described herein, the plurality of barriers 106 can isolate each of the plurality of hollow cells 104 from each other. By using the plurality of barriers 106 to form the plurality of hollow cells 104, the synthetic fiber 100 can eliminate any single point of failure compared to fibers having a single hollow core. That is, if a fiber having a single hollow core is punctured, all of the gas trapped within the fiber can escape from the core. In contrast, if the synthetic fiber 100 according to embodiments of this disclosure is punctured, the gas from a single one of the plurality of hollow cells 104 may escape but the remaining plurality of hollow cells 104 can maintain the gas entrapped therein.

Depending on the implementation, the synthetic fiber 100 can have a diameter that ranges from 5 to 120 μm. In some embodiments, the diameter of the synthetic fiber 100 may range from 1 to 10 μm in a pressurized environment. Depending on the embodiment, the length L of each of the plurality of hollow cells 104 as measured along the length of the fiber 100 may be in the range of 1 mm to 10 cm. Synthetic fibers 100 having a diameter in the example ranges can be woven into a self-adaptive fabric in accordance with this disclosure. For different applications, one or more of the following parameters can be adjusted to affect the properties of a self-adaptive fabric woven from the synthetic fiber 100: synthetic fiber 100 diameter, the size of the plurality of hollow cells 104 (for example, the lengths of each of the cells 104), the wall thickness T of the body 102, and the material properties of the synthetic fiber 100. For example, adjusting these parameters can adapt the self-adaptive fabric to a certain predetermined shape, form a conformal structure over a body, and/or a freeform structure in space. As one example, a thinner wall thickness will result in a synthetic fiber 100 experiencing more expansion moving from ambient pressure to a vacuum environment compared to a synthetic fiber 100 having a thicker wall. Advantageously, as will be described in further detail below, when the self-adaptive fabric according to embodiments of this description is incorporated into a space suit, the space suit can be put on as regular clothes. As soon as the astronaut steps into a vacuum environment wearing the space suit, the suit expands and can form into a shape conformal to the body while also inducing a pressure on the astronaut's skin and body.

Figure 2A:
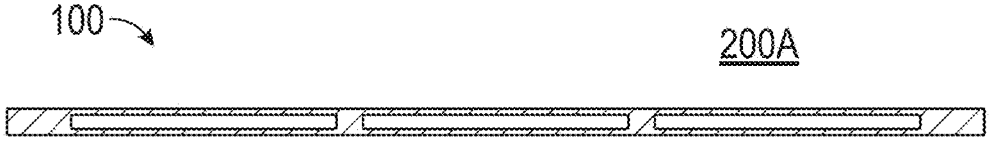
FIGS. 2A and 2B are cross-sectional views of the synthetic fiber at an ambient pressure and in a vacuum, respectively, according to aspects of this disclosure.
Figure 2B:

FIGS. 2A and 2B are cross-sectional views of the synthetic fiber 100 at an ambient pressure 200A and in a vacuum 200B, respectively, according to aspects of this disclosure. As shown in FIG. 2A, when exposed to the ambient pressure 200A, the cell pressure (for example, the pressure of the gas enclosed in the plurality of hollow cells 104) may be substantially equal to ambient pressure 200A. Depending on the location of the synthetic fiber 100, ambient pressure may be substantially equal to atmospheric pressure (for example, on the Earth) or another ambient pressure of a pressurized environment (for example, in a spacecraft, a space station, a space habitat, etc.).

Upon exposure to a lower pressure (for example, moving to the vacuum 200B), the cell pressure will be greater than the environmental pressure, resulting in an increase in the diameter of the synthetic fiber 100 as shown in FIG. 2B. In the vacuum 200B environment, the diameter of the synthetic fiber 100 increases until the cell pressure of the plurality of hollow cells 104 equalizes with the elastic force of the synthetic fiber 100 due to stretching of the synthetic fiber 100.

In some embodiments, the volume of the synthetic fiber 100 in the vacuum 200B may be about four times the volume of the synthetic fiber 100 at ambient pressure 200A. For example, assuming a cell length L of 10 mm, if a cell of the synthetic fiber 100 has a diameter of about 1 mm at ambient pressure 200A (and a volume of 7.85 $mm^3$), the synthetic fiber 100 may have a diameter of about 2 mm (and a volume of 31.4 $mm^3$) in the vacuum 200B. The reaction time for the synthetic fiber 100 to arrive at its final diameter in response to a change in pressure (for example, moving from ambient pressure 200A to vacuum 200B or vice versa), may be relatively quick (for example, on the order of milliseconds or less). In one non-limiting example, an individual synthetic fiber 100 can reach a final dimension in the range of milliseconds. In another non-limiting example, a fabric including a plurality of the fibers 100 can have a longer response time to reach its final dimension, in the range of seconds.

Figure 3A:
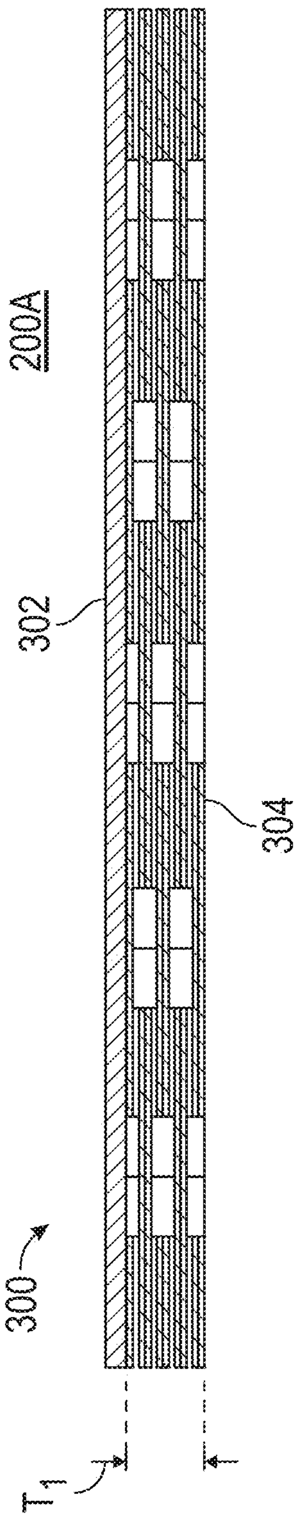
FIGS. 3A and 3B are cross-sectional views of a fabric at an ambient pressure and in a vacuum, respectively, according to aspects of this disclosure.
Figure 3B:
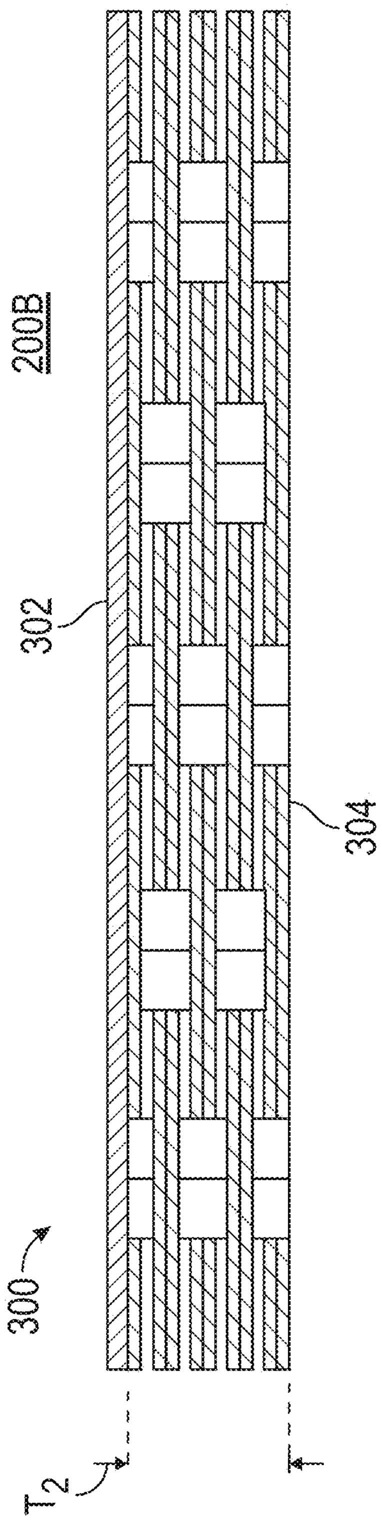

FIGS. 3A and 3B are cross-sectional views of a fabric 300 at an ambient pressure 200A and in a vacuum 200B, respectively, according to aspects of this disclosure. With reference to FIGS. 3A and 3B, the fabric 300 includes a structural fabric 302 attached to a self-adaptive fabric 304. The self-adaptive fabric 304 can be formed of a plurality of synthetic fibers 100 woven together (such as, for example, the synthetic fiber 100 of FIGS. 1, 2A, and 2B). In some embodiments, the structural fabric 302 can be formed of Kevlar and/or carbon fiber (which can be braided together), fiberglass, polymer fibers (for example, polyester), ceramic fibers, such as alumina, etc. The fabric 300 provides a structure that is configured to restrict the direction in which the self-adaptive fabric 304 expands or contracts when exposed to the changing environmental pressure. For example, the self-adaptive fabric 304 will have a first thickness $T_1$ when exposed to ambient pressure 200A as illustrated in FIG. 3A, and the first thickness $T_1$ will increase to a second thickness $T_2$ when exposed to vacuum 200B, as illustrated in FIG. 3B. As described above, the reaction time for the fabric 300 to arrive at its final thickness in response to a change in pressure (for example, moving from ambient pressure 200A to vacuum 200B or vice versa), may be slower than the reaction time for an individual synthetic fiber 100. For example, reaction time for the fabric 300 may be on the order of seconds.

Although the fabric 300 is illustrated as a flat or generally planar material in FIGS. 3A and 3B, the fabric can be sewn or otherwise constructed into various shapes depending on the application. For example, when forming a spacesuit, the fabric 300 can be constructed to form the shape of the spacesuit, such that the structural fabric 302 provides structure that guides the expansion/contraction of the self-adaptive fabric 304.

In some embodiments, the layers of self-adaptive fabric 304 can be woven with a gradient that provides a gradual transition from the structural fabric 302 into the self-adaptive fabric 304. When using such a gradient, the amount of expansion of the self-adaptive fabric 304 can vary depending on the quantity of synthetic fibers at a given layer of the fabric 300. However, aspects of this disclosure are not limited thereto and the self-adaptive fabric 304 can be attached to the structural fabric 302 as separate layers without a gradual transition therebetween.

Figure 4:
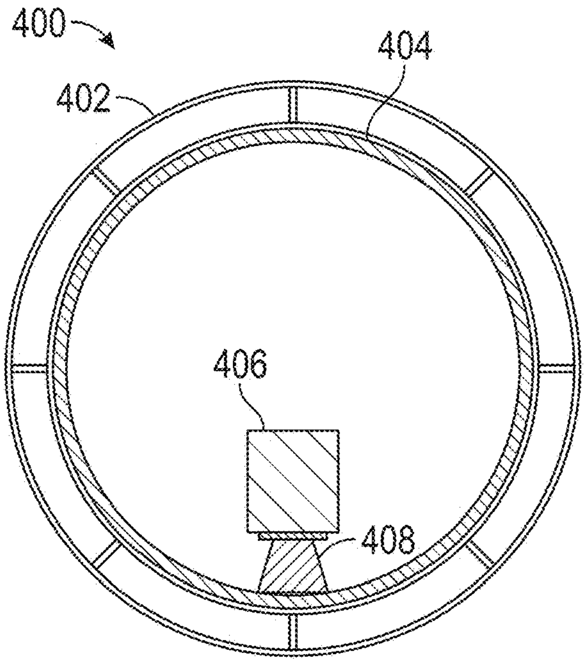
FIG. 4 is a schematic diagram of an inflatable habitat in accordance with aspects of this disclosure.

FIG. 4 is a schematic diagram of an inflatable habitat 400 in accordance with aspects of this disclosure. As shown in FIG. 4, the inflatable habitat 400 includes a self-adaptive fabric 402 (such as, for example, the self-adaptive fabric 304 of FIGS. 3A and 3B) and a structural liner 404 (such as, for example, the structural fabric 302 of FIGS. 3A and 3B). A dispenser 406 can be used to dispense metal 408 to form a structural metal shell inside the structural liner 404.

The self-adaptive fabric 402 can be used to deploy the structural liner 404 in space by expanding when exposed to the vacuum environment of space. The self-adaptive fabric 402 can also function as a multilayer insulation and micrometeoroid and orbital debris (MMOD) protection system. The self-adaptive fabric 402 can further be combined with other high performance fabric materials to improve structural efficiency and impact resistance for MMOD protection.

In some embodiments, the structural liner 404 can be formed of braided carbon fiber to form sufficient structure to the deployed inflatable habitat 400 while the metal shell is constructed. After the self-adaptive fabric 402 has fully inflated, the dispenser 406 can be used to form the structural metal shell inside of the structural liner 404. Depending on the embodiment, the dispenser 406 can use physical vapor deposition (PVD) to dispense metal, or a molten metal dispensing system can be used to dispense molten metal, to apply layers of metal on the structural liner 404 and form the structural metal shell.

The self-adaptive fabric 402 can be formed of a plurality of layers of woven synthetic fibers 100. For example, the plurality of layers of woven synthetic fibers 100 can include features of the self-adaptive fabric 304 of FIGS. 3A and 3B. The number of layers of woven synthetic fibers 100 may be selected based on the size of the inflatable habitat 400 and the properties of the synthetic fibers 100. For example, the self-adaptive fabric 402 can be designed to provide an amount of force sufficient to pull the structural liner 404 into the shape of the inflatable habitat 400 (for example, the circular cross-sectional shape illustrated in FIG. 4 in some embodiments) and maintain the shape of the inflatable habitat 400 while the metal shell is applied onto the structural liner 404 by the dispenser 406.

As shown in FIG. 4, the self-adaptive fabric 402 is located closer to the exterior of the habitat 400 than the structural liner 404. Because the self-adaptive fabric 402 is formed on the exterior of the structural liner 404, the self-adaptive fabric 402 will pull the structural liner 404 outwards when exposed to a vacuum environment. When the inflatable habitat 400 is deployed in microgravity, the amount of force required to deploy the inflatable habitat 400 may be significantly less than in environments where gravity is not negligible (for example, on the Earth, the Moon, etc.).

After the metal shell has been fully constructed using the dispenser 406, the metal shell may provide significantly more support for the inflatable habitat 400 than the self-adaptive fabric 402. Thus, if the self-adaptive fabric 402 loses some of its structural integrity (for example, if one or more of the plurality of hollow cells 104 is punctured or otherwise loses its gas), the inflatable habitat 400 can still maintain structural integrity from the metal shell.

For some applications, the inflatable habitat 400 can be transported within a pressurized spacecraft to a location at which the inflatable habitat 400 is to be deployed. Duc to the pressurized environment, the inflatable habitat 400 can be transported in a compact form (for example, folded or otherwise reduced in size) during transportation. After arriving, the inflatable habitat 400 can be deployed into the vacuum environment, which results in the self-adaptive fabric 402 inflating the inflatable habitat 400. Thus, the inflatable habitat 400 can automatically deploy when it is introduced to the vacuum environment.

There are many advantages to the inflatable habitat 400 over other techniques. One advantage is that larger habitats can be constructed compared to other techniques. In typical habitats, the size of the rocket fairing can limit the size of structures that can be deployed, which is not the case for the inflatable habitats 400 described herein. In addition, typical habitats are pressurized from the inside, which requires significantly more resources that the inflatable habitats 400 described herein. For example, since the inflatable habitat 400 can deploy in response to being exposed to a vacuum environment, additional gas supplies are not required to deploy the inflatable habitat 400. Thus, the inflatable habitat 400 can be deployed to manufacture an in-space, habitat pressure vessel. Advantageously, the size of the habitat pressure vessel according to aspects of this disclosure can be large or super-large as compared to sizes of vessels using other techniques.

Figure 5:
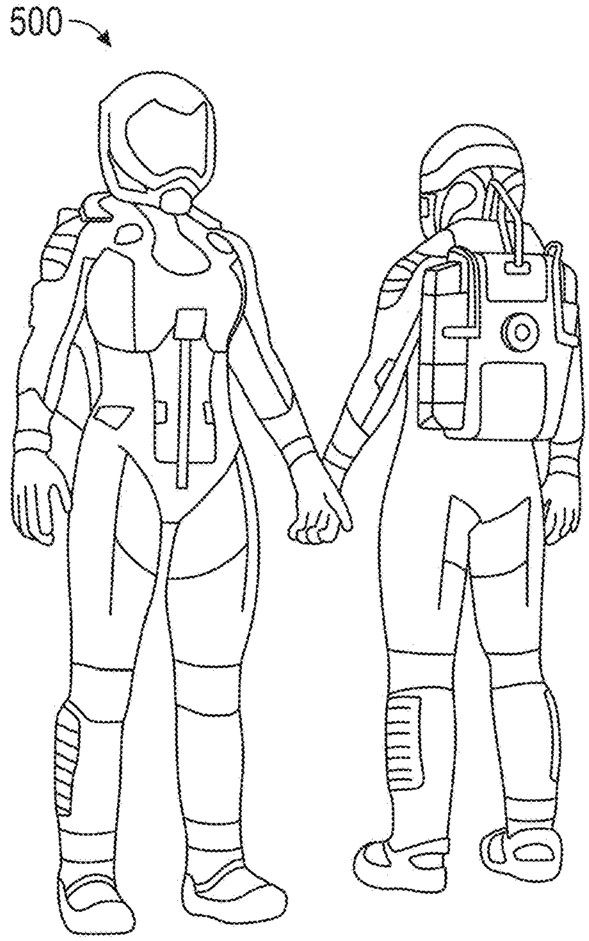
FIG. 5 illustrates an embodiment of a spacesuit in accordance with aspects of this disclosure.

FIG. 5 illustrates an embodiment of a spacesuit 500 in accordance with aspects of this disclosure. The spacesuit can include a self-adaptive fabric (such as the self-adaptive fabric 304 of FIGS. 3A and 3B) and a structural liner (such as the structural fabric 302 of FIGS. 3A and 3B). The spacesuit 500 can be put on by an astronaut as regular clothes in a pressurized environment. When the astronaut steps into vacuum environment, the spacesuit 500 expands and forms into a shape conformal to the astronaut's body. The structural liner can be positioned on the exterior of the spacesuit 500 with the self-adaptive fabric closer to the interior of the spacesuit 500 to restrict the direction in which the self-adaptive fabric expands, such that the self-adaptive fabric expands towards the astronaut's body when exposed to the vacuum environment. Thus, the self-adaptive fabric can be constrained by the structural fabric such that the self-adaptive fabric expands into the interior of the spacesuit 500 when exposed to decreasing environmental pressures.

The self-adaptive fabric can induce a pressure on the astronaut's skin and body to protect the astronaut's body from the vacuum environment. The pressure applied to the astronaut's skin and body by embodiments of the self-adaptive fabric according to this disclosure is a mechanical counterpressure that uses mechanical force due to the expansion of the hollow cells in the vacuum environment. In some embodiments, the spacesuit 500 may be skin-tight on the astronaut when exposed to the vacuum environment.

In some embodiments, the spacesuit 500 is not sealed, allowing the astronaut's skin to be exposed to the vacuum environment. Thus, the spacesuit 500 may be moisture permeable to allow moisture to escape. When the spacesuit 500 is not sealed, an internal moisture (for example, sweat) can be at least partially exhausted to the vacuum environment through the spacesuit 500. Thus, the spacesuit 500 can provide a passive mechanism for exhausting moisture, thereby preventing excessive accumulation of moisture within the spacesuit 500. In contrast, traditional spacesuits may form a closed compartment where air and moisture are trapped inside, requiring moisture handling system(s) to ensure that moisture is precisely controlled and does not build up.

In certain embodiments, the spacesuit 500 may have a thickness of about 1 mm when exposed to a pressurized environment, and the thickness can expand to a thickness of about 2 mm when exposed to a vacuum environment. When in the pressurized environment, the spacesuit 500 may be designed to provide a gap of about 1 mm between the skin of the astronaut and the self-adaptive fabric. In some embodiments, the amount of expansion of the spacesuit 500 combined with the designed gap between the spacesuit 500 and the astronaut's skin in the pressurized environment can be designed to exert a pressure of 10-12 psi on the astronaut's body. Since an astronaut's body is formed of soft tissues having an irregular shape, the gap between the astronaut's skin and the self-adaptive fabric may be an important design aspect selected to provide a substantially uniform pressure to the astronaut's body.

The number of layers of the self-adaptive fabric included in the spacesuit 500 can be adjusted to optimize the comfort level for the astronaut. For example, additional layers can increase comfort in certain cases, while fewer layers may make the spacesuit 500 more difficult to put on. In some embodiments, the spacesuit 500 may have 5-20 layers of the self-adaptive fabric, however, aspects of this disclosure are not limited thereto. In some embodiments, the number of layers of the self-adaptive fabric can vary in different locations of the spacesuit 500. For example, it may be preferable to exert less pressure on certain locations of the astronaut's body, and thus, the spacesuit 500 may have fewer layers of self-adaptive fabric in these locations.

In some embodiments, the spacesuit 500 can also include a plurality electrical wires woven into the self-adaptive fabric. The electrical wires can be configured to generate heat to maintain the temperature of the astronaut within safe and/or comfortable levels. For example, the electrical wires may generate heat through resistivity. The electrical wires can regulate the temperature within the spacesuit 500 through the self-adaptive fabric.

Figure 6:
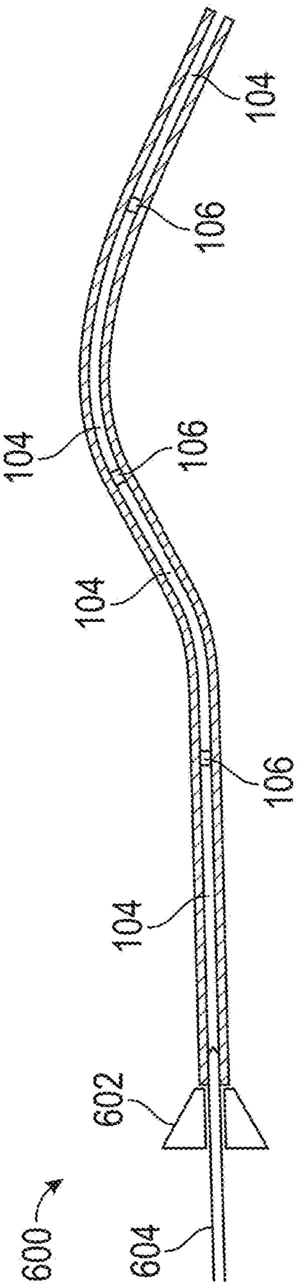
FIG. 6 provides an illustration of a device that can be used to manufacture a synthetic fiber in accordance with this disclosure.

FIG. 6 provides an illustration of a device 600 that can be used to manufacture a synthetic fiber 100 in accordance with this disclosure. As shown in FIG. 6, the device 600 includes an extruder 602 and a needle 604. The extruder 602 is configured to provide a stream of material (for example, elastic or elastomeric material used to form the self-adaptive fabric material). The needle 604 is configured to periodically inject a gas into a center of the stream of material to create a plurality of gas-filled hollow cells 104. In periods when the needle 604 does not inject the gas into the stream of material, the extruder 602 can provide the stream of material to form barriers 106 that separate the hollow cells 104. For example, the extruder 602 can be configured to extrude the material as a solid tube and the needle 604 can create the plurality of hollow cells 104 by periodically injecting the gas into the center of the material. The needle 604 can adjust the amount of gas injected into the material depending on the properties of the synthetic fiber 100 to be created.

Figure 7:
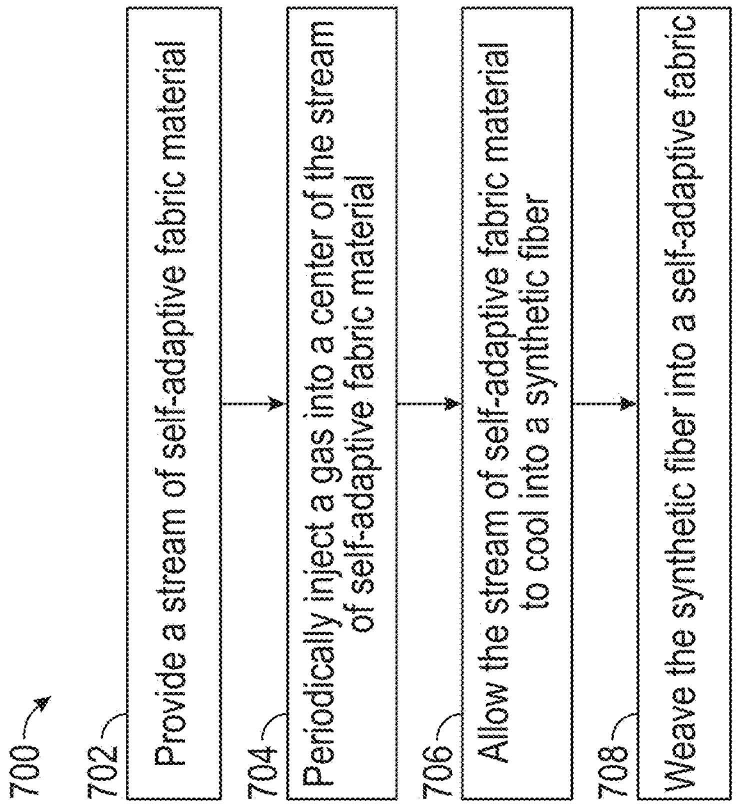
FIG. 7 illustrates a method of manufacturing a fabric for use in space in accordance with aspects of this disclosure.

FIG. 7 illustrates a method 700 of manufacturing a fabric for use in space in accordance with aspects of this disclosure. At block 702, the method 700 involves providing a stream of self-adaptive fabric material. For example, the stream of self-adaptive fabric material can be provided by an extruder (for example, the extruder 602 of FIG. 6).

At block 704, the method 700 involves periodically injecting a gas into a center of the stream of self-adaptive fabric material to create a plurality of gas-filled hollow cells. For example, a needle (for example, the needle 604 of FIG. 6) can be used to inject the gas into the center of the stream of self-adaptive fabric material.

At block 706, the method 700 involves allowing the stream of self-adaptive fabric material to cool into a synthetic fiber. At block 708, the method 700 involves weaving the synthetic fiber into a self-adaptive fabric. In some embodiments, the self-adaptive fabric (for example, the self-adaptive fabric 304 of FIGS. 3A and 3B) can be weaved into a structural fabric (such as the structural fabric 302 of FIGS. 3A and 3B). Weaving the self-adaptive fabric into the structural fabric can include weaving an interface between the structural fabric and the self-adaptive fabric that includes a gradual transition from the structural fabric into the self-adaptive fabric.

As described herein, the self-adaptive fabric according to aspects of this disclosure can be deployed in a vacuum environment without using any separate deployment mechanisms or bladders, greatly simplifying the systems incorporating the self-adaptive fabric while simultaneously improving reliability. By eliminating the need for deployment mechanisms or bladders, the self-adaptive fabric can be incorporated into systems without the mass, cost, maintenance, and/or risk of single point of failure associated with deployment mechanisms and/or bladders. There are many applications for the self-adaptive fabric, including but not limited to, spacesuits and space habitats.

Terminology

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A self-adaptive fabric comprising:

a plurality of synthetic fibers woven to form the self-adaptive fabric, wherein each of the plurality of synthetic fibers comprises a plurality of hollow cells containing a trapped gas, and wherein the plurality of synthetic fibers are formed of a material having a sufficient elasticity such that the diameter of each of the plurality of synthetic fibers is configured to change in response to changes in the environmental pressure.

2. The self-adaptive fabric of claim 1, wherein the hollow cells are isolated from each other such that gas and liquid does not pass between adjacent hollow cells.

3. The self-adaptive fabric of claim 1, wherein the gas comprises carbon dioxide, argon, nitrogen, and/or air.

4. The self-adaptive fabric of claim 1, wherein the material of the synthetic fibers comprises a polyether-polyurea copolymer, Spandex, and/or Lycra.

5. A fabric comprising:

the self-adaptive fabric of claim 1; and a structural fabric attached to the self-adaptive fabric.

6. The fabric of claim 5, wherein the structural fabric and the self-adaptive fabric are moisture permeable to allow moisture to escape.

7. The fabric of claim 5, wherein the structural fabric is configured to restrict a direction in which the self-adaptive fabric expands when exposed to the changes in the environmental pressure.

8. The fabric of claim 5, wherein the structural fabric and the self-adaptive fabric are woven together.

9. The fabric of claim 8, wherein an interface between the structural fabric and the self-adaptive fabric includes a gradual transition from the structural fabric into the self-adaptive fabric.

10. The fabric of claim 5, wherein the structural fabric comprises Kevlar and/or carbon fiber.

11. A space suit comprising the fabric of claim 5, wherein:

the fabric is orientated such that the self-adaptive fabric is closer to the interior of the space suit than the structural fabric.

12. The space suit of claim 11, wherein the self-adaptive fabric is constrained by the structural fabric such that the self-adaptive fabric expands into the interior of the space suit when exposed to the decreasing environmental pressure.

13. The space suit of claim 11, wherein the self-adaptive fabric is configured to apply a pressure of 10-12 psi to a user of the space suit.

14. An inflatable habitat comprising the fabric of claim 5, wherein:

the fabric is orientated such that the self-adaptive fabric is closer to the exterior of the inflatable habitat than the structural fabric.

15. The inflatable habitat of claim 14 further comprising:

layers of metal applied to the interior of the structural fabric to form a structural metal shell.

16. A method of manufacturing a self-adaptive fabric, the method comprising:

providing a stream of synthetic material;

periodically injecting a gas into a center of the stream of synthetic material to create a plurality of gas-filled hollow cells;

allowing the stream of synthetic material to cool into a synthetic fiber, the synthetic fiber formed of a material having a sufficient elasticity such that the diameter of the synthetic fiber is configured to change in response to changes in the environmental pressure; and weaving the synthetic fiber into a self-adaptive fabric.

17. The method of claim 16 further comprising:

providing a structural fabric; and attaching the self-adaptive fabric to the structural fabric.

18. The method of claim 17, wherein attaching the self-adaptive fabric to the structural fabric comprises weaving the self-adaptive fabric into the structural fabric.

19. The method of claim 18, wherein weaving the self-adaptive fabric into the structural fabric comprises weaving an interface between the structural fabric and the self-adaptive fabric that includes a gradual transition from the structural fabric into the self-adaptive fabric.

20. The method of claim 16, wherein injecting the gas into the center of the stream of synthetic material is performed using a needle.

21. The method of claim 16, wherein the hollow cells are isolated from each other such that gas and liquid does not pass between adjacent hollow cells.

22. The method of claim 16, wherein the gas comprises carbon dioxide, argon, nitrogen, or air.

* * * * *